E. RUSSELL.
Tree-Boxes.
No. 165,455.   Patented July 13, 1875.
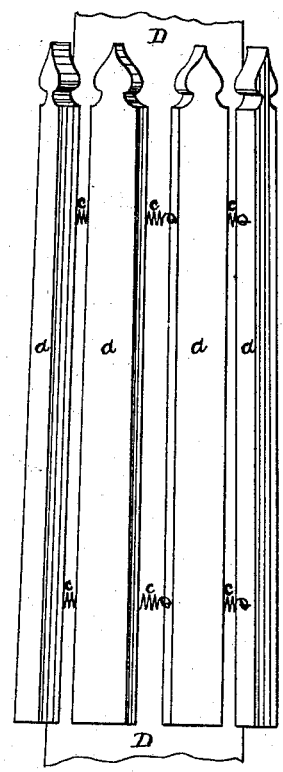
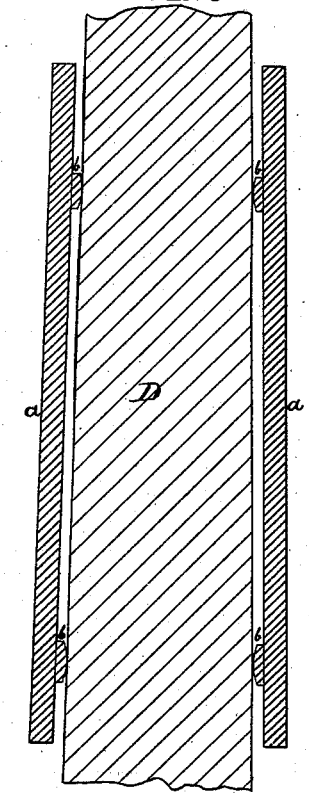
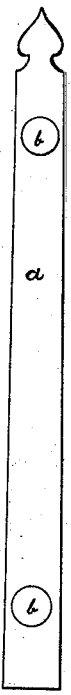
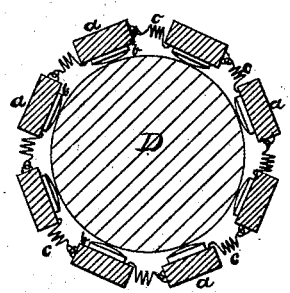
WITNESSES:
F. G. Clausen.
R. Fingen.
INVENTOR:
Edward Russell

UNITED STATES PATENT OFFICE.

EDWARD RUSSELL, OF DAVENPORT, IOWA.

IMPROVEMENT IN TREE-BOXES.

Specification forming part of Letters Patent No. 165,455, dated July 13, 1875; application filed May 4, 1875.

*To all whom it may concern:*

Be it known that I, EDWARD RUSSELL, of Davenport, State of Iowa, have invented a Tree-Box, of which the following is a specification:

The object of my invention is to provide a tree-box or casing for the protection of the trunks of shade and other growing trees from injury by the rubbing of cattle, biting of horses, striking of vehicles, &c., and yet be so closely united to the tree itself as to prevent possibility of injury thereto, as is common to the use of the ordinary wooden box for shade and other trees, from the swaying of the tree in the wind, and the resulting chafing of the top of the tree-box against the bark. It is also the object of my invention to secure the above-described protection to the tree with a box that shall always accommodate itself to the irregularity of form in the tree trunk, and to the increase of size in the tree-trunk or stem, by expanding or contracting at each of the several divisions or sections, into which the box is, for the purpose of such freedom of agreement with and expansion with the tree, separated by the several slats or strips. This combination of springs and slats, as described, enables the construction of a tree-box that can also be readily disjointed and taken apart at any one of the divisions between the several sections, or at any of the several springs or elastic bands or fastenings, by opening the hook or staple of such spring or elastic fastening, so that any section of the box, or the whole thereof, can at any time be removed for the purpose of cleaning the tree, &c., and be as readily replaced, as occasion may require. These objects are effected by constructing the box of vertical slats or strips of wood *a*, each connected with the other, and held in place by springs or elastic bands of wire or rubber *c*, by which, also, the slats are held firmly to the tree, so that at each and every part of the tree-box there shall be close adherence to the tree by the tree-box, and yet there be secured entire elasticity in the box, as the form and development of the tree may require. The slats are kept from contact with the tree D, injurious thereto, by pads or pieces of wood, or of rubber, or of similar material, *b*, as shown in the sectional view, Figure 1, of the accompanying drawing.

The method of constructing the box and placing it in use is more particularly illustrated in the perspective view, Fig. 2, and in the vertical section, Fig. 3. The application of the pad *b* is more particularly shown in Fig. 4, showing the inside surface of the vertical section or slab of the tree-box.

My invention therefore consists in the construction of a tree-box that can readily be disjointed and taken apart at any one of the divisions between the several sections, at any of the several springs or elastic bands or fastenings, by opening the hook or staple of such spring or elastic fastening, so that any section of the box, or the whole thereof, can at any time be removed for the purpose of cleaning the tree, &c., and be as readily replaced, as occasion may require.

Having thus set forth my invention, I claim as new and desire to secure by Letters Patent—

The spring or elastic band *c* between each and every slat, or strip, or section of tree-box, in combination with the slats and pads, substantially as described.

Davenport, Iowa, April 29, 1875.

EDWARD RUSSELL.

Witnesses:
F. G. CLAUSEN,
R. FINGER.